United States Patent [19]
White

[11] 3,730,247
[45] May 1, 1973

[54] REPAIR PATCHES AND METHODS

[76] Inventor: John D. White, 239 South Irvindale Avenue, Azusa, Calif. 91702

[22] Filed: May 24, 1971

[21] Appl. No.: 146,265

Related U.S. Application Data

[63] Continuation-in-part of Ser. No. 845,204, July 28, 1969, abandoned.

[52] U.S. Cl............................152/367, 18/18 R, 9/11, 152/354
[51] Int. Cl..............................................B60c 21/02
[58] Field of Search..................152/367; 161/DIG. 2; 156/94, 95, 97, 98; 18/18 R

[56] References Cited

UNITED STATES PATENTS

| | | | |
|---|---|---|---|
| 2,943,969 | 7/1960 | Boyer et al. | 152/367 X |
| 3,282,319 | 11/1966 | Barnett | 152/367 |
| 3,003,537 | 10/1961 | Engstrom | 156/132 X |
| 3,394,405 | 7/1968 | Conklin | 156/94 |

Primary Examiner—Robert J. Spar
Attorney—Luc P. Benoit

[57] ABSTRACT

An inflatable structure, such as an automobile tire or a rubber boat, or a patch for use in the repair of pneumatic devices, has first and second groups of elastic strips woven as strips in intertwining relationship.

A method of repairing a damaged portion of a radial ply tire uses a tire patch having a first group of elastic strips and a second group of elastic strips extending at right angles to the strips in the first group. These strips in the first group are oriented in parallel to the radial plies when the repair patch is applied to the damaged portion. In this manner, the strips in the second group are oriented at right angles to the radial plies. The strips in the first and second groups are preferably woven as strips in intertwining relationship.

26 Claims, 8 Drawing Figures

Patented May 1, 1973

Patented May 1, 1973
3,730,247
3 Sheets-Sheet 2
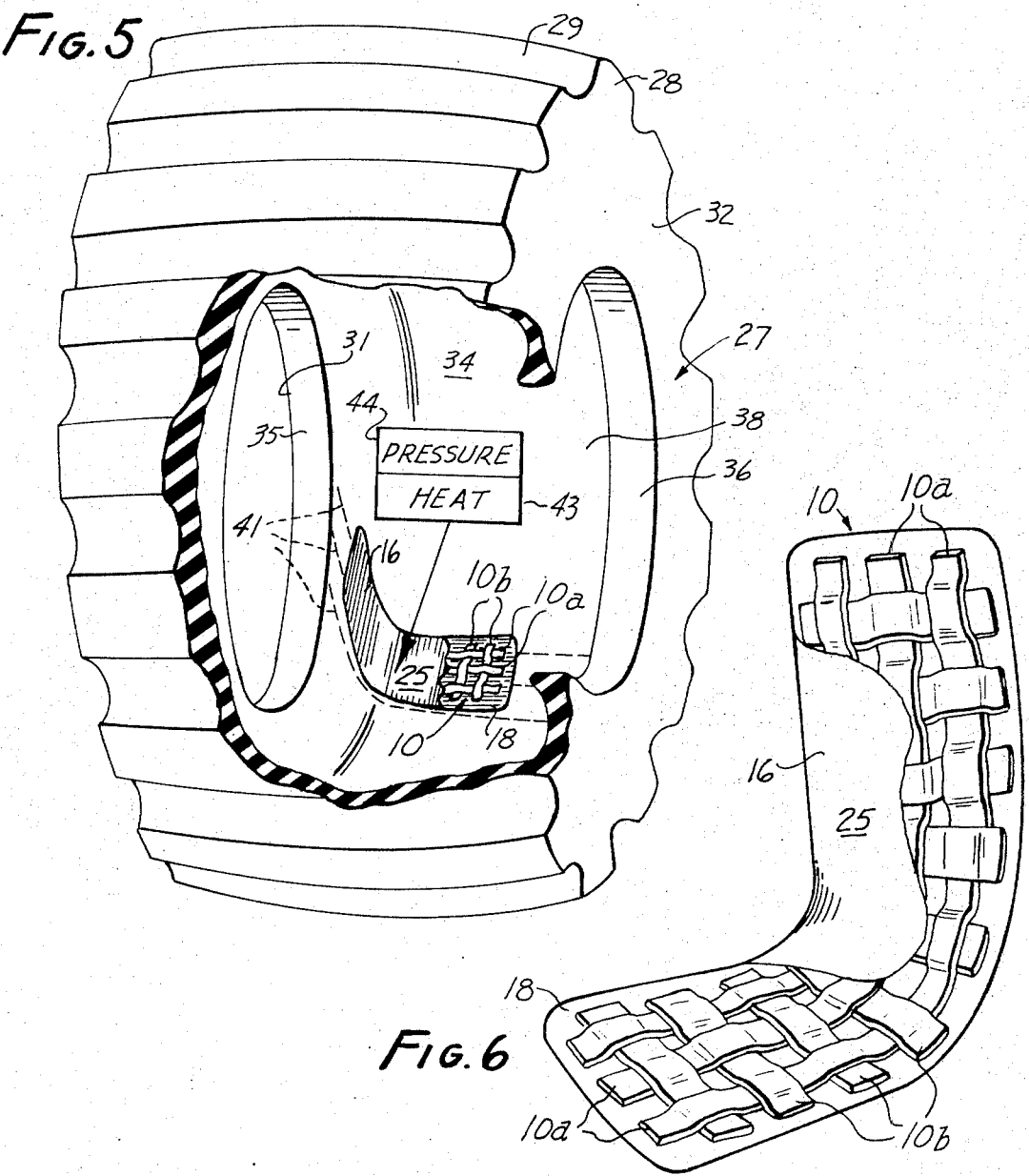
Fig. 5
Fig. 6
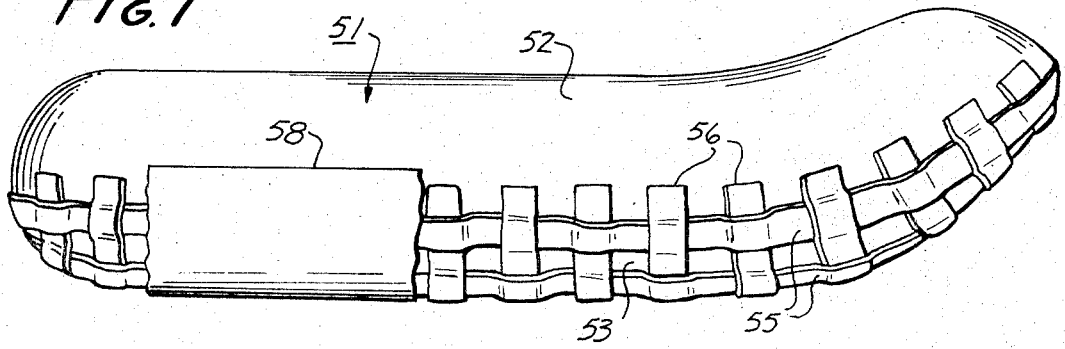
Fig. 7

REPAIR PATCHES AND METHODS

CROSS-REFERENCE TO RELATED APPLICATIONS

The subject patent application is a continuation-in-part of the allowed Patent application Ser. No. 845,204, for Tire Patch, filed July 28, 1969, by the present inventor and now abandoned. The disclosure of that allowed Patent application Ser. No. 845,204 is herewith incorporated by reference herein.

BACKGROUND OF THE INVENTION

1. Field of the Invention

The subject invention relates to pneumatic devices, such as tires, rubber boats and other inflatable structures, and, more particularly, to methods and patches for repairing pneumatic devices and to the construction of inflatable structures.

2. Description of the Prior Art

Conventional tire repair patches are subject to frequent failure, particularly in the case of heavy-equipment tires. In an attempt to overcome this disadvantage, the prior art has proposed the use of tire patches which contain flat strips that run crosswise of each other. This still left something to be desired in terms of attainable flexibility.

It has thus been proposed to cut the flat strips at intermediate points so that stresses acting on one side of the patch would not completely be transmitted to the other side of the patch where they would separate the patch from the tire. This proposed solution is unsatisfactory in that it dissects the strips which are supposed to lend strength to the patch.

On a somewhat different plane, conventional bias-ply tires have recently been replaced by radial-ply tires in many applications. Such radial-ply tires tend to be stiff and bumpy and are thus unsuitable in many applications.

Another drawback of radial-ply tires is that they are difficult to repair in that conventional patches applied in accordance with conventional repair techniques separate themselves from the tire during use thereof.

In the boating field, the spread of inflatable rubber boats is being stifled by the fact that existing constructions offer little protection against tearing of such vital parts as the bottom of the boat by underwater rock formations or by debris. Also, existing constructions place a severe limit on loads that can be accommodated inside the boat.

SUMMARY OF THE INVENTION

From one aspect thereof, the subject invention resides in a patch for use in the repair of pneumatic devices, comprising in combination a group of substantially parallel elastic first strips and a group of substantially parallel elastic second strips. According to the subject invention, the first strips are spaced from each other, the second strips are spaced from each other, and the first and second strips are woven as strips in intertwining relationship. The patch according to the subject invention further includes means connected to the first and second strips for forming a unitary patch with the first and second strips.

The named first and second strips may include uncured rubber or an uncured curable elastomer, which is cured during the application of the patch to the pneumatic device. The first and second strips include elastic material and reinforcing means, such as a plurality of cords extending substantially longitudinally of each strip.

Because of their woven and intertwining relationship, the strips are capable of absorbing or accommodating large stresses. In particular, the woven and intertwining relationship of the strips prevents stresses from being transmitted along strips from end to end. In this manner, a separation of patch corners or edges from the tire due to transmitted stresses is effectively prevented.

The woven and intertwining relationship of the strips according to the subject invention also permits the applied tire patch to readily accommodate the well-known dimensional changes that occur in automobile tires or other pneumatic devices due to temperature variations. Many prior-art patches that appeared satisfactory when applied to the tire at room temperature became separated as the tire heated up during the use thereof.

Another problem should also be considered at this juncture. In the use of heavy construction equipment it is very common that tires of such equipment are repeatedly driven over sharply protruding rocks, sometimes several hundred times in a single day. In each such instance, the tire is heavily flexed, leading to tearing and separation of applied prior-art repair patches. Due to the woven and intertwining relationship of the above mentioned strips, patches according to the subject invention will accommodate and successfully withstand even extreme flexing stresses imposed on the tire.

What has been said so far applies also to situations where the patches according to the subject invention are applied to the repair of such structures as inflatable rubber boats and other pneumatic devices.

From another aspect thereof, the subject invention is concerned with a method of repairing a damaged portion of a tire having an outside, an inside and radial plies between the outside and inside. The invention resides in the improvement comprising, in combination, the steps of providing a group of elastic first strips including elastic material and reinforcing means, a group of elastic second strips including elastic material and reinforcing means, and at least two elastic sheets, weaving the first and second strips as strips in intertwining relationship, with the first strips being spaced from and substantially parallel to each other, and the second strips being spaced from and substantially parallel to each other and extending substantially at right angles to the first strips, forming with the aid of the woven first and second strips and the elastic sheets a unitary tire repair patch in which the woven first and second strips are located between the two elastic sheets. The damaged portion of the tire is prepared for an application of the tire repair patch. According to the invention, the tire repair patch is applied to the prepared damaged portion on the inside of the tire and the first strips in the patch are oriented substantially in parallel to the radial plies, whereby the second strips in the patch are oriented substantially at right angles to the radial plies, and the applied tire repair patch is sealed to the tire on the inside of the tire at the damaged portion.

The method according to the subject invention has proved very effective in repairing radial-ply tires and in providing patches that will last for the life of the tire under various flexing, heat expansion, and other operating conditions. The woven and intertwining relationship of the named strips is essential to this success.

The subject invention also resides in an article of manufacture comprising, in combination, a tire having an outside, an inside, and radial plies between the outside and inside, and a tire patch sealed to the tire at the inside thereof. According to the invention, the tire patch comprises, in combination, a first sheet of elastic material sealed to the tire at the inside, a second sheet of elastic material having a circumferential portion sealed to the first sheet, a group of elastic first strips and a group of elastic second strips located between the first and second elastic sheets, with the first strips being spaced from and substantially parallel to each other and substantially parallel to the radial plies of the tire, the second strips being spaced from and substantially parallel to each other and extending substantially at right angles to the radial plies, and the first and second strips being woven as strips in intertwining relationship, means for connecting at least the first strips to the first sheet, and means for connecting the second strips at least to the first strips.

This article of manufacture is characterized by a tire patch that will last for the life of the tire under various flexing, heat expansion, and other operating conditions; mainly due to the great flexibility and strength provided by the interwoven and intertwined strips as mentioned above.

The subject invention also resides in an inflatable structure, characterized by the improvement comprising, in combination, a group of substantially parallel elastic first strips, a group of substantially parallel elastic second strips, with the first strips being spaced from each other, the second strips being spaced from each other, and the first and second strips being woven as strips in intertwining relationship, and means connected to the first and second strips for forming a unitary inflatable device. In accordance with a preferred embodiment of the invention, the inflatable structure is a tire, the means connected to the first and second strips include an outer tire portion and an inner tire portion, the outer tire portion including side wall and tread portions, and the inner tire portion including an air-impervious liner, and the first and second strips being located between the outer and inner tire portions.

In accordance with another preferred embodiment of the invention, the inflatable structure is an inflatable boat, the means connected to the first and second strips include an inflatable boat proper having a bottom, and the first and second strips are located at least in this bottom.

BRIEF DESCRIPTION OF THE DRAWINGS

The invention and its various aspects will become more readily apparent from the following detailed description of preferred embodiments thereof, illustrated by way of example in the accompanying drawings, in which:

FIG. 5 is a perspective view, with parts broken away, of a radial-ply tire with a tire patch in accordance with a preferred embodiment of the subject invention;

FIG. 6 is a perspective view, with parts broken away, of a tire patch for use in the repair of the tire of FIG. 5;

FIG. 7 is a perspective view, with parts broken away, of a pneumatic rubber boat structure in accordance with a further preferred embodiment of the subject invention.

Like reference numerals in the drawings designate like or functionally equivalent parts.

DESCRIPTION OF PREFERRED EMBODIMENTS

Figure 1:
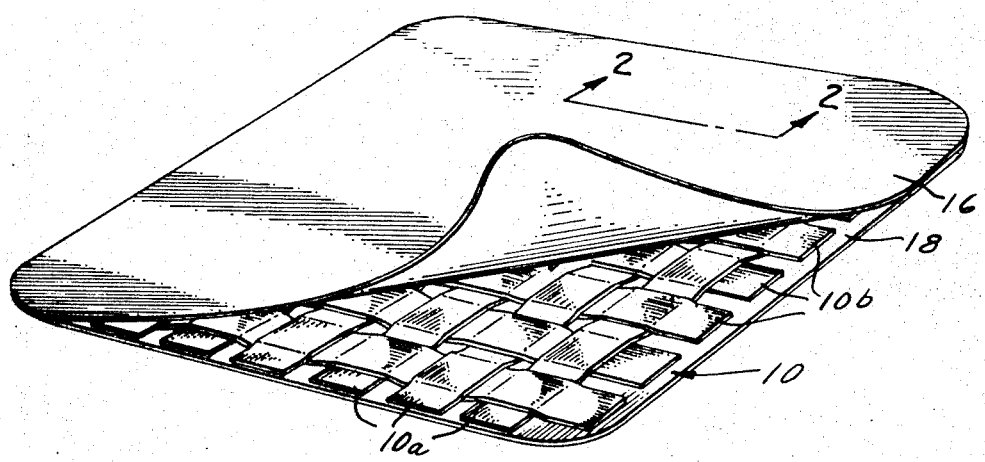
FIG. 1 is a perspective view of a patch embodying the subject invention, with an upper cover sheet partially raised to show details of the internal patch structure.
Figure 2:
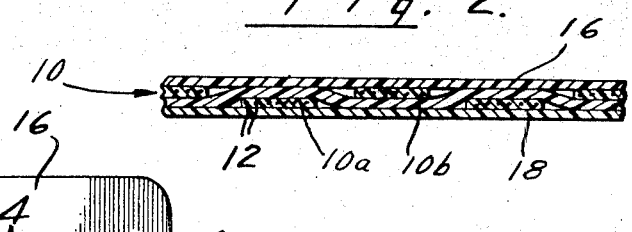
FIG. 2 is a sectional view taken on line 2 — 2 of FIG. 1.

The repair patch according to FIGS. 1 and 2 has a group of substantially parallel elastic first strips 10a and a group of substantially parallel elastic second strips 10b. The first strips 10a are spaced from each other and the second strips 10b are spaced from each other. The first and second strips 10a and 10b are woven as strips in intertwining relationship as shown. The first strips 10a extend alternately over and under the second strips 10b and vice versa. In the illustrated preferred embodiment, the second strips 10b extend substantially at right angles to the first strips 10a. Other angular relationships between these strips 10a and 10b are, however, possible in practice.

The strips 10a and 10b include an elastic material, and reinforcing means in the form of a plurality of embedded cords 12 extending longitudinally of the respective strips 10a and 10b. Suitable cord materials include rayon and nylon.

The set 10 of woven and intertwined strips 10a and 10b is located between two elastic sheets 16 and 18 of air-impervious material.

Portions of the second strips 10b adhere to portions of the first strips 10a where the strips contact each other at crossing points. Similarly, contacting portions of the strips 10a and 10b adhere to the sheet 16 and 18, respectively. If desired, conventional rubber cement may be applied to the surfaces of the strips 10a and 10b and to the inside surfaces of the sheets 16 and 18 to assure an adherence of these strips to each other and to the illustrated sheets.

The strips 10a and 10b and the sheets 16 and 18 may be of uncured rubber, or of an uncured curable elastomer. By way of example, and not by way of limitation, suitable materials include natural rubber, synthetic rubber or acrylonitrile-butadiene, styrene-butadiene, or neoprene (polymerized chloroprene).

Uncured rubber-impregnated nylon cord stock in sheet form is readily available on the market and may be employed for making the strips 10a and 10b. The strips and also the outer sheets 16 and 18 may be of cushion gum which is sold by many manufacturers and which is somewhat sticky, thereby promoting an adherence of the strips to each other and to the outer sheets.

The outer surfaces of the sheets 16 and 18 may be covered with a non-sticking material such as conventional Holland cloth. Prior to use of the patch, the Holland cloth sheet (not shown) is removed from the outer sheet surface which is to be applied to the tire.

Preparatory to the application of the tire patch, the inside of the tire at the damaged portion is buffed down to the cords. The tire puncture may be filled with unvulcanized rubber which is preferably of a type known in the art as tread compound. Other details about the preparation of the tire for the repair patch may be seen from U.S. Pat. No. 3,282,319, for Tire Patch, by E.E. Barnett, issued Nov. 1, 1966, and herewith incorporated by reference herein.

A rubber cement or another conventional adhesive is applied to the buffed tire portion before the patch is laid in the tire. With the Holland cloth removed from the particular patch surface, the patch is laid in the tire with the cords of the strips extending preferably in alignment with the cords of the tire to the extend that this is practically possible.

The tire is placed in a mold for heat treatment or vulcanizing. To this end, an electric heat pad may be placed within the tire on top of the applied patch and adjacent tire portions. An inner tube or other pneumatic device may then be inserted in the tire on top of the heat pad. The inner tube or pneumatic device is inflated and the patch and underlying rubber cement portions are cured with heat and pressure. Practical pressures include those in the 50 lbs. range.

The patch, when vulcanized, is in effect, an integral part of the tire. Because of the great strength, flexibility, and stress absorption capability of the woven and intertwined strips 10a and 10b, relatively thin patches may effectively be employed.

Should the injury or puncture be relatively large, the damaged portion of the tire may be cut from the casing and the resulting edges buffed. The resulting hole is then filled with unvulcanized or uncured rubber, such as tread compound, as mentioned above. The patch is then installed, also as described above.

Figure 3:
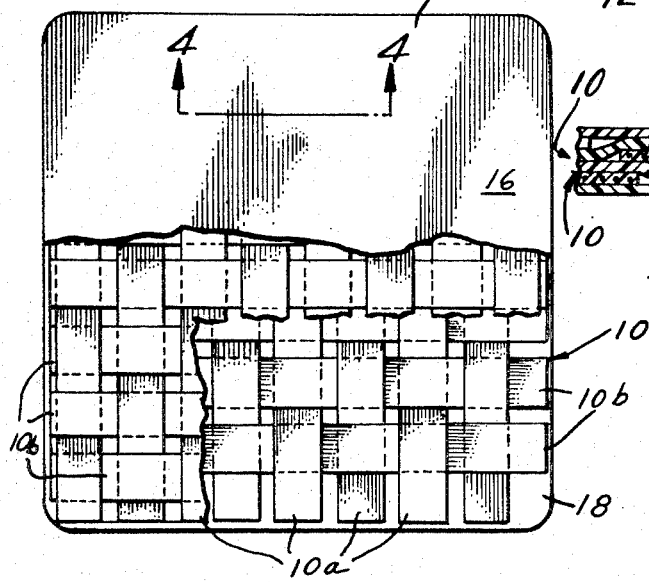
FIG. 3 is a top plan view, with parts broken away, of a patch in accordance with a further preferred embodiment of the subject invention.

For the repair of large holes or damaged portions, the patch may have a plurality of sets 10 of interwoven strips in intertwining relationship. By way of example, FIG. 3 shows two such sets of strips. Of course, more than two sets of woven and interlaced strips may be used if desired. The second set of woven and intertwined strips may be identical to the first set. If the strips 10a and 10b in the first set 10 are designated as first and second strips, then the corresponding strips in the second set may be designated as third and fourth strips. As the first strips, the third strips are spaced from each other. As the second strips, the fourth strips are also spaced from each other. The third and fourth strips are moreover woven as strips in intertwining relationship.

The sets of strips are secured together either by reason of their inherent stickiness or by means of a rubber cement.

FIGS. 5 and 6 show a tire patch for repairing radial-ply tires and illustrate a method for repairing such tires as well as a tire repaired according to such method.

The repair patch 25 according to the preferred embodiment of the subject of the invention illustrated in FIGS. 5 and 6 has an oblong configuration having a length equal to several times its width. The strips 10a are correspondingly longer than the strips 10b, with the long strips 10a extending longitudinally of the patch 25, while the strips 10b extend at right angles to the strips 10a.

Figure 4:
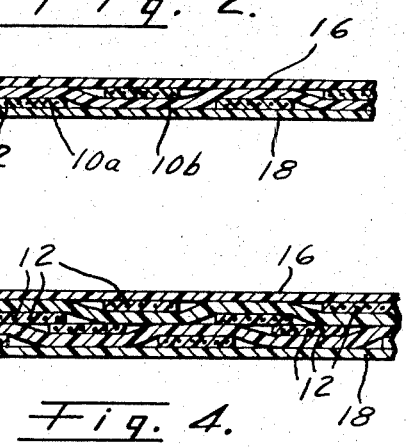
FIG. 4 is a sectional view taken on line 4 — 4 of FIG. 3.

As illustrated in FIGS. 5 and 6, the strips 10a and 10b are woven in intertwining relationship in substantially the same manner as has been shown in FIGS. 1 and 2. The remainder of the patch of FIGS. 5 and 6 may be of the same construction as the patch of FIGS. 1 and 2 or the multi-set patch of FIGS. 3 and 4, except for the oblong configuration of the sheets 16 and 18. As a rule, the patch 25 is sufficiently flexible to be readily bent to the desired shape if only one set 10 of strips 10a and 10b is used. The patch 25, may, however, be preformed by the manufacturer to the desired curvature when several sets 10 of crossed strips are contained therein in the manner shown in FIGS. 3 and 4.

FIG. 5 shows a radial-ply tire 27 having an outside 28 with a tread 29 and sidewalls 31 and 32. The tire 27 also has an inside 34 and a pair of rims 35 and 36.

The radial plies are hidden by the conventional air-impervious liner 38 on the inside 34 of the tire 27. Some of the radial plies are, however, indicated by dotted lines 41.

In practice, the damaged portion of the tire 27 is prepared for an application of the tire repair patch 25 in the above mentioned manner. The tire repair patch is then applied to the prepared damaged portion on the inside 34 of the tire 27, such as shown in FIG. 5. During such application, the longitudinal first strips 10a in the patch 25 are oriented in parallel to the radial plies 41. Expressed in other words, the patch 25 is so oriented that the longitudinal strips 10a extend in parallel to the radial plies 41. This, in turn, orients the short strips 10b substantially at right angles to the radial plies.

In accordance with a preferred embodiment of the subject invention, the repair patch 25 is dimensioned to extend on the inside 34 of the tire 27 from a central portion below the tread 29 to a location adjacent one of the rim portions, such as the rim portion 35 as shown in FIG. 5. It has been found in practice that such a dimensioning and extent of the repair patch 25 is frequently required in the case of radial-ply tires for a reliable and lasting repair, whether the tire damage be in a sidewall or in the tread portion.

Upon completed application and orientation, the repair patch 25 is sealed or vulcanized to the tire 27 on the inside thereof and at the damaged portion. Suitable vulcanizing and pressure applying equipment has been described above. A box 43 in FIG. 5 symbolically illustrates suitable means, such as an electric heating pad, for imparting the requisite vulcanizing temperatures to the applied patch 25. A box 44 diagrammatically illustrates suitable equipment, such as an inner tube or other pneumatic device, for applying pressure to the patch 25 during the vulcanization or curing process.

The result of this operation is an article of manufacture which comprises, in combination, the radial-ply tire 27 and the applied patch 25 as described above, in a vulcanized or cured state integral with the tire 27.

In the operation of the tire 27, the patch 25 is very effective in maintaining the damaged portion sealed, in that the longitudinal strips 10a will absorb or accommodate stresses that occur longitudinally of the radial plies 41, while the transverse strips 10b will act as cross-braces, so to speak, in absorbing or accommodating stresses that occur transversely of the radial plies 41. Because of the intertwined relationship of the strips 10a and 10b, even heavy stresses and shocks are readily absorbed without a separation of the patch from the tire 27.

FIG. 7 is a perspective view of a rubber boat 51. The view of FIG. 7 is believed sufficient since rubber boats are very well known. They customarily comprise an inflatable or inflated endless rubber tube 52 having an oblong toriodal configuration encompassing a useful space for one or more persons and for cargo, depending on the size of the boat. A rubber bottom 53 is integral with the tube 52 and closes the useful boat space at the lower end thereof. Some prior-art rubber boats cover the rubber structure with canvas, and the subject invention can also be applied to such canvas-covered rubber boats.

A plurality of longitudinal elastic strips 55 extends along the bottom 53 for and aft of the boat 51.

A plurality of transverse elastic strips 56 extends across the bottom 53 athwart of the boat 51.

The strips 55 and 56 correspond to the above mentioned strips 10a and 10b and may be of the same material and composition. As seen in FIG. 7, the strips 55 and 56 are woven in intertwining relationship. The strips 55 and 56 preferably extend not only over the bottom 53 but also onto the Rubber tube 52.

The strips 55 and 56 may be applied to the boat in an uncured or unvulcanized state, while the tube 52 and bottom 53 are also in an uncured or unvulcanized state. A cover-sheet 58, which may be of the same material as one of the above mentioned sheets 16 and 18, may be applied over the strips 55 and 56. The cover-sheet 58 may also be applied in an uncured or unvulcanized state. If desired, a similar sheet may be interposed between the bottom 53 and the strips 55 and 56.

The tube 52, bottom 53, strips 55 and 56 and cover-sheet 58 may then be vulcanized in one operation. Conventional vulcanizing techniques and equipment of the type heretofore used for vulcanizing the inflatable tube and bottom of conventional rubber boats may be employed for this purpose.

The boat according to the subject invention is characterized by a high structural integrity and also by an extra-ordinary resistance against impact by submarine rock formations or by debris. Stresses or blows occurring at one location are readily absorbed along the strips 55 and 56 because of the woven and intertwining relationship thereof. This woven and intertwining relationship at the same time prevents a shock transmission of stresses so that a separation of strips from the bottom 53 and tube 52 is successfully avoided. The strips may extend onto and along the outside and/or inside of the tube 52 to render the same more resistant to stresses and shock impact.

Figure 8:
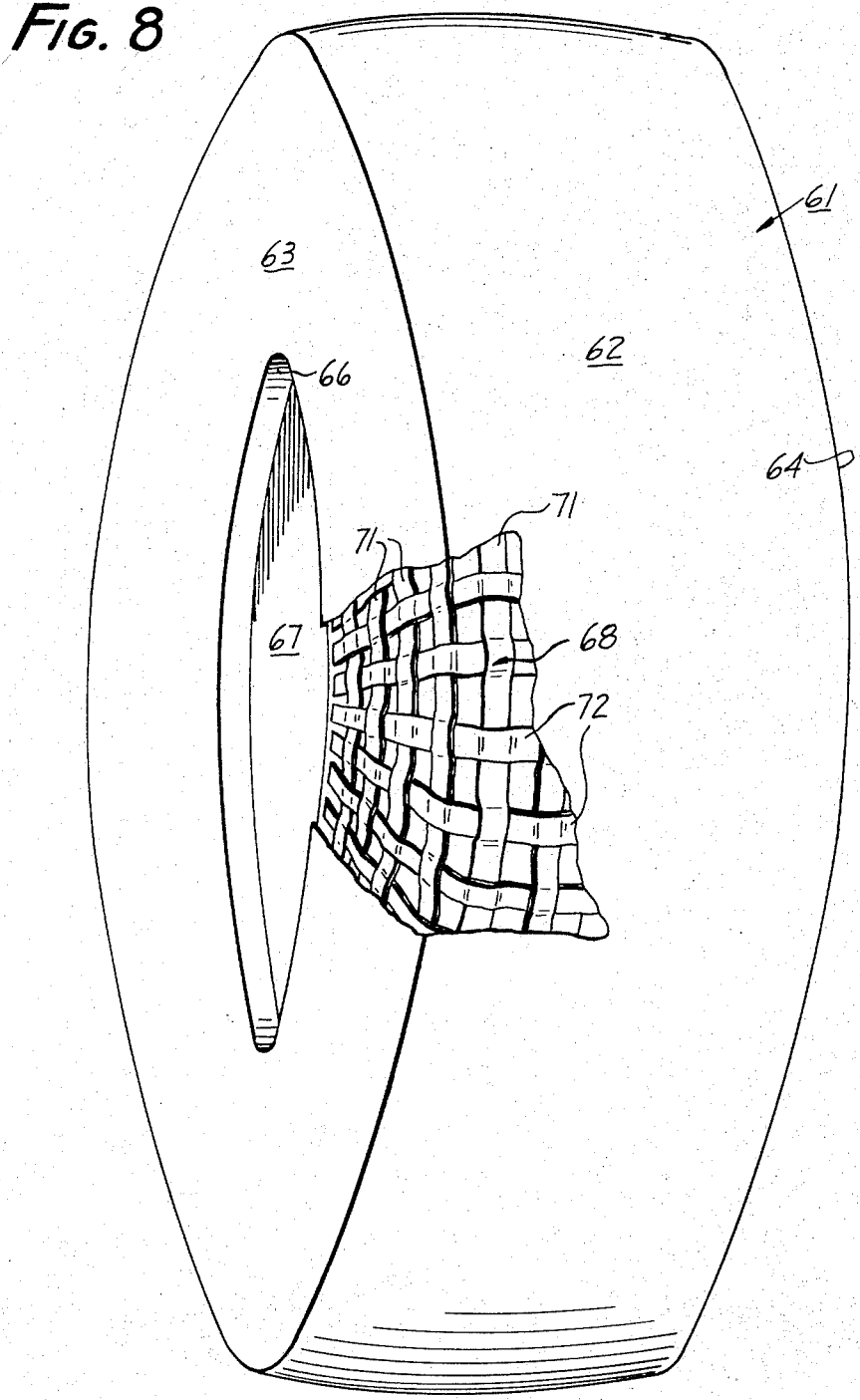
FIG. 8 is a perspective view, with parts broken away, of an automobile tire structure in accordance with a further preferred embodiment of the subject invention.

The tire 61 of FIG. 8 may be of a tubeless type or of a tube type. The tire 61 has a diagrammatically illustrated tread portion 62 and sidewalls 63 and 64 of conventional suitable rubber stock. Reference is made in this connection to U.S. Pat. No. 3,003,537, for Pneumatic Tire and Method of Making Same, By C.F. Engstrom et al., issued Oct. 10, 1961, and herewith incorporated by reference herein.

The tire 61 has two conventional rim portions, one of which is visible at 66. The tire 61 also has a conventional air-impervious inner liner 67.

In accordance with the subject invention, the traditional bias-ply or radial-ply structure is replaced or supplemented by a crossed-strip structure 68. The crossed-strip structure 68 is composed of circumferential strips 71 and transverse or radial strips 72.

The strips 72 extend substantially at right angles to the strips 71, and the strips 71 and 72 are woven as strips in intertwining relationship. This intertwining relationship gives the strips 71 and 72 elastic and flexible properties as mentioned above in connection with FIGS. 1 to 7. The resulting tire is thus capable of absorbing or accommodating greater stresses and shock loads than conventional bias-ply or radial-ply tires.

The strips 71 and 72 may be of the same material as the above mentioned strips 10a and 10b. The set 68 may be multiplied one or more times to provide several layers of crossed and interwoven strips (see FIGS. 3 and 4 and accompanying text). If desired, one or more of the crossed-strip sets 68 may be employed in the manufacture of bias-ply or radial-ply tires to reinforce the structure thereof.

The unvulcanized structure of the tire may be assembled in a conventional manner, except that one or more sets or layers of crossed strips 71 and 72 are employed in lieu of, or in addition to, bias plies or radial plies. The crossed-strip set or sets is or are then vulcanized along with the other parts of the tire into a unitary tire structure.

Reverting to the repair patches herein disclosed, it will be noted that the same are also suitable for the repair of pneumatic devices other than tires. By way of example, and not by way of limitation, the patches shown in FIGS. 1 to 4 may be employed in the repair of such devices as rubber boats and the like. The woven and intertwined relationship of the strips in the repair patch is particularly advantageous in these applications in accommodating stresses and shock loads and precluding a separation of the patch from the pneumatic device.

It will be noted at this juncture that all woven structures herein disclosed have the common feature of including undulating or sinuous strips which on the basis of their configuration are capable of accommodating and absorbing shock loads and other stresses.

While specific embodiments have been illustrated herein, variations or modifications within the spirit and scope of the invention will suggest themselves or become apparent to those skilled in the art.

I claim:

1. A patch for use in the repair of pneumatic devices, comprising in combination:
   a group of substantially parallel elastic first strips including elastic material and reinforcing means;
   a group of substantially parallel elastic second strips including elastic material and reinforcing means;
   said first strips being spaced from each other, said second strips being spaced from each other, and said first and second strips being woven as strips in intertwining relationship; and
   means connected to said first and second strips for forming a unitary patch with said first and second strip.

2. A patch as claimed in claim 1, wherein:

said reinforcing means in said first strips include a plurality of cords extending substantially longitudinally of said first strips; and said reinforcing means in said second strips include a plurality of cords extending substantially longitudinally of said second strips.

3. A patch as claimed in claim 1, wherein:
said elastic material in said first strips is uncured rubber; and
said elastic material in said second strips is uncured rubber.

4. A patch as claimed in claim 1, wherein:
said elastic material in said first strips is an uncured curable elastomer; and said elastic material in said second strips is an uncured curable elastomer.

5. A patch as claimed in claim 1, wherein:
said second strips extend substantially at right angles to said first strips.

6. A patch as claimed in claim 5, wherein:
portions of said second strips contact and adhere to portions of said first strips 7. A patch as claimed in claim 5, including:
an adhesive located on said first and second strips for connecting portions of said second strips to adjacent portions of said first strips.

8. A patch as claimed in claim 1, wherein:
said first strips extend alternately over and under said second strips.

9. A patch as claimed in claim 1, wherein:
said means connected to said first and second strips include an elastic sheet connected to said intertwined first and second strips.

10. A patch as claimed in claim 1, wherein:
said means connected to said first and second strips include two elastic sheets having said intertwined first and second strips located therebetween.

11. A patch as claimed in claim 10, wherein:
said two elastic sheets include uncured rubber.

12. A patch as claimed in claim 10, wherein:
said two elastic sheets include an uncured curable elastomer.

13. A patch as claimed in claim 1, wherein:
said intertwined first and second strips form a first set of woven strips;
said patch includes a second set of woven strips adjacent said first set of woven strips;
said second set of woven strips includes, in combination, a group of substantially parallel elastic third strips, a group of substantially parallel elastic fourth strips, said third strips being spaced from each other, said fourth strips being spaced from each other, and said third and fourth strips being woven as strips in intertwining relationship; and
said means connected to said strips include means connected to said sets of woven strips for forming a unitary patch with said first and second sets of woven strips.

14. A patch as claimed in claim 13, wherein:
said third strips include a plurality of cords extending substantially longitudinally of said third strips; and
said fourth strips include a plurality of cords extending substantially longitudinally of said fourth strips.

15. A patch as claimed in claim 13, wherein:
said third strips include uncured rubber and reinforcing means in said uncured rubber; and said fourth strips include uncured rubber and reinforcing means in said uncured rubber.

16. A patch as claimed in claim 13, wherein:
said third strips include an uncured curable elastomer; and
said fourth strips include an uncured curable elastomer.

17. A patch as claimed in claim 13, wherein:
said means connected to said sets of woven strips include two elastic sheets having said first and second sets of woven strips located therebetween.

18. A patch as claimed in claim 17, wherein:
said two elastic sheets include uncured rubber.

19. A patch as claimed in claim 17, wherein:
said two elastic sheets include an uncured curable elastomer.

20. In a method of repairing a damaged portion of a tire having an outside, an inside, and radial plies between said outside and inside, the improvement comprising in combination the steps of:
providing a group of elastic first strips including elastic material and reinforcing means, a group of elastic second strips including elastic material and reinforcing means, and at least two elastic sheets;
weaving said first and second strips as strips in intertwining relationship, with said first strips being spaced from and substantially parallel to each other, and said second strips being spaced from and substantially parallel to each other and extending substantially at right angles to said first strips;
forming with the aid of said woven first and second strips and said elastic sheets a unitary tire repair patch in which said woven first and second strips are located between said two elastic sheets;
preparing said damaged portion of said tire for an application of said tire repair patch; and
applying said tire repair patch to said prepared damaged portion on the inside of said tire and orienting said first strips in said patch substantially in parallel to said radial plies, whereby said second strips in said patch are oriented substantially at right angles to said radial plies and sealing said applied tire repair patch to said tire on the inside of said tire at said damaged portion.

21. A method as claimed in claim 20, wherein:
said tire has a tread portion and rim portions; and
said tire repair patch is dimensioned to extend on the inside of said tire from a central portion below said tread portion to a location adjacent one of said rim portions.

22. A method as claimed in claim 21, wherein:
said reinforcing means of said first strips include a plurality of cords extending substantially longitudinally of said first strips; and
said reinforcing means of said second strips include a plurality of cords extending substantially longitudinally of said second strips.

23. A method as claimed in claim 22, wherein:
said elastic material for said first and second strips is uncured rubber; and
said uncured rubber is cured during said sealing of said applied tire repair patch to said tire.

24. A method as claimed in claim 23, wherein:
said two elastic sheets include uncured rubber; and said two elastic sheets are cured during said sealing of said applied tire repair patch to said tire.

25. A method as claimed in claim 22, wherein:
said elastic material for said first and second strips in an uncured curable elastomer; and
said elastomer is cured during said sealing of said applied tire repair patch to said tire.

26. A method as claimed in claim 25, wherein:
said elastic sheets include an uncured curable elastomer; and
said two elastic sheets are cured during said sealing of said applied tire repair patch to said tire.

* * * * *